US007629266B2

(12) United States Patent
Fucsko et al.

(10) Patent No.: US 7,629,266 B2
(45) Date of Patent: Dec. 8, 2009

(54) ETCH COMPOSITIONS AND METHODS OF PROCESSING A SUBSTRATE

(75) Inventors: Janos Fucsko, Boise, ID (US); Grady S. Waldo, Boise, ID (US); Joseph Wiggins, Boise, ID (US); Prashant Raghu, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 377 days.

(21) Appl. No.: 11/680,916

(22) Filed: Mar. 1, 2007

(65) Prior Publication Data

US 2007/0145009 A1 Jun. 28, 2007

Related U.S. Application Data

(62) Division of application No. 11/191,685, filed on Jul. 27, 2005, now Pat. No. 7,491,650.

(51) Int. Cl.
*H01L 21/302* (2006.01)
(52) U.S. Cl. .................. 438/745; 438/689; 438/704; 257/E21.219; 257/E21.223; 257/E21.309; 216/83; 216/108; 216/109; 252/79.1; 252/79.2
(58) Field of Classification Search .............. 438/689, 438/704, 745; 257/E21.219, E21.223, E21.309; 216/83, 108, 109; 252/79.1, 79.2, 79.3
See application file for complete search history.

(56) References Cited

U.S. PATENT DOCUMENTS

| | | | | |
|---|---|---|---|---|
| 3,960,741 | A * | 6/1976 | Gabrail | 252/79.3 |
| 4,024,085 | A * | 5/1977 | Kobayashi et al. | 101/466 |
| 5,340,437 | A | 8/1994 | Erk et al. | |
| 5,656,097 | A | 8/1997 | Olesen et al. | |
| 5,928,969 | A | 7/1999 | Li et al. | |
| 5,960,289 | A | 9/1999 | Tsui et al. | |
| 6,204,106 | B1 | 3/2001 | Gonzalez | |
| 6,252,276 | B1 | 6/2001 | Ramsbey et al. | |
| 6,573,175 | B1 | 6/2003 | Yin et al. | |
| 6,579,766 | B1 | 6/2003 | Tews et al. | |
| 6,703,319 | B1 | 3/2004 | Yates et al. | |
| 6,807,824 | B1 | 10/2004 | Miwa | |
| 7,052,627 | B1 | 5/2006 | Kezuka et al. | |
| 2003/0042526 | A1 | 3/2003 | Weimer | |
| 2003/0125225 | A1 * | 7/2003 | Xu et al. | 510/175 |
| 2004/0245644 | A1 | 12/2004 | Yin et al. | |
| 2006/0049132 | A1 * | 3/2006 | Wu et al. | 216/17 |

OTHER PUBLICATIONS

Kang, Tsung-Kuei, et al. "Selectivity investigation of HfO/sub 2/ to oxide using Wet Etching" 2004, IEEE pp. 87-90.
Byu, http://www.ee.byu.edu/cleanroom/everthing_wafers.phtml Aug. 16, 2004.
Motorola Corporation "Surface Cleaning and Wet Processing Terminology" 1999 Arizona Board of Regents for The University of Arizona.
Bertagna et al., "Corrosion Rate of n- and p- Silicon Substrates in HF, HF + HCI, and HF + NH4F Aqueous Solutions", J. Electrochem. Soc., 1999, pp. 83-90, vol. 146(1).
Bertagna et al., "Ionic components dependence of the charge transfer reactions at the silicon/HF solution interface", J. Solid State Electrochem, Mar. 1999, pp. 42-51, vol. 4.
Bertagna et al., "Electrochemical study for the characterisation of wet silicon oxide surfaces", Electrochimica Acta, Mar. 2001, pp. 129-136, vol. 47.
Bertagna et al., "Electrochemical and Radiochemical Study of Copper Contamination Mechanism from HF Solutions onto Silicon Substrates", Electrochemical Society Proceedings, pp. 128-135, vol. 97-35, 1998.
Schnabel et al., "Photoelectrochemical characterization of p- and n-doped single crystalline silicon carbide and photoinduced reductive dehalogenation of organic pollutants at p- doped silicon carbide", Electrochimica Acta, Feb. 2001, pp. 719-727, vol. 47.
Garrido et al., "The Role of Chemical Species in the Passivation of <100> Silicon Surfaces by HF in Water-Ethanol Solutions", J. Electrochem. Soc., Dec. 1996, pp. 4059-4066, vol. 143 No. 12.
Wood, Allison "Etching Silicon Nitride and Silicon Oxide Using Ethylene Glycol/Hydrofluoric Acid Mixtures", Electrochemical Society Proceedings, vol. 97-36, pp. 258-263, 2000.
Deckert, "Pattern Etching of CVD Si3N4/SiO2 Composites in HF/Glycerol Mixtures", J. Electrochem. Soc., Nov. 1980, pp. 2433-2438.
Knotter et al., "Etching Mechanism of Silicon Nitride in HF-Based Solutions", J. Electrochem. Soc., 2001, pp. F43-F46, vol. 148(3).
Kezuka et al., "The Control of Etching Rate for Various SiO2 Films", Electrochemical Society Proceedings, 2000, pp. 244-251, vol. 99-36.

* cited by examiner

*Primary Examiner*—Laura M Menz
*Assistant Examiner*—Colleen E Snow
(74) *Attorney, Agent, or Firm*—Wells St. John P.S.

(57) ABSTRACT

The invention includes an etchant composition containing isopropyl alcohol and one or more of HF, $NH_4F$ and tetramethyl ammonium fluoride (TMAF). The invention encompasses a method of processing a substrate. A substrate is provided which has a first material containing at least one of polysilicon, monocrystalline silicon and amorphous silicon, and a second material. The substrate is exposed to an etch composition which comprises isopropyl alcohol and at least one of HF, $NH_4F$ and TMAF. The invention includes a method of processing a semiconductor construction including providing a construction which has a capacitor electrode material and an oxide material along at least a portion of the capacitor electrode material. At least some of the oxide material is removed by isotropic etching utilizing an etchant composition comprising isopropyl alcohol.

15 Claims, 9 Drawing Sheets

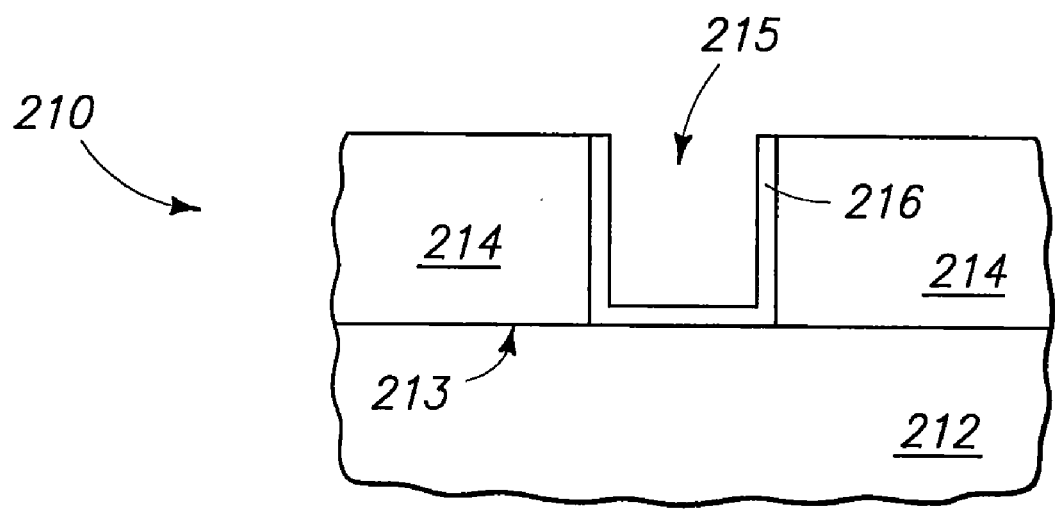
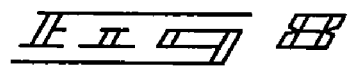
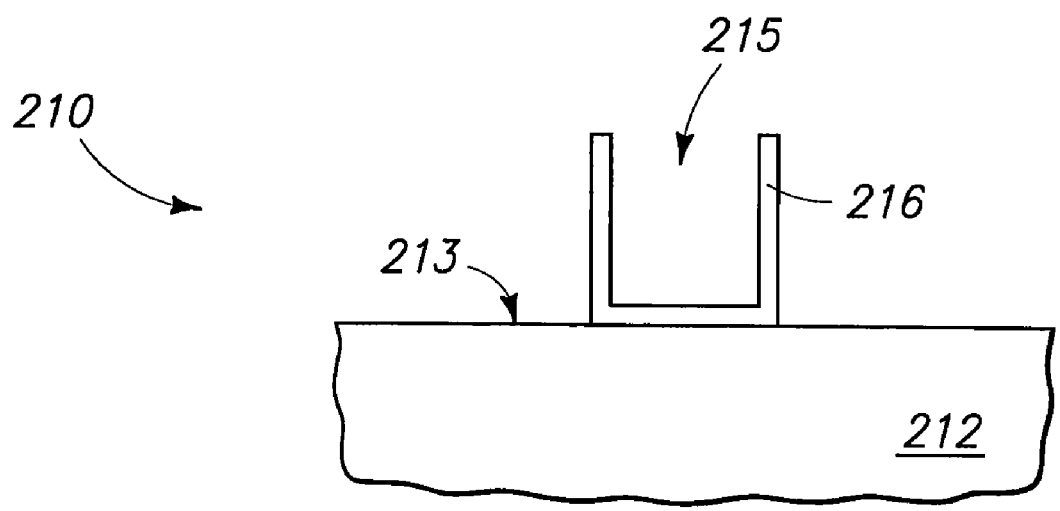
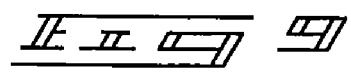

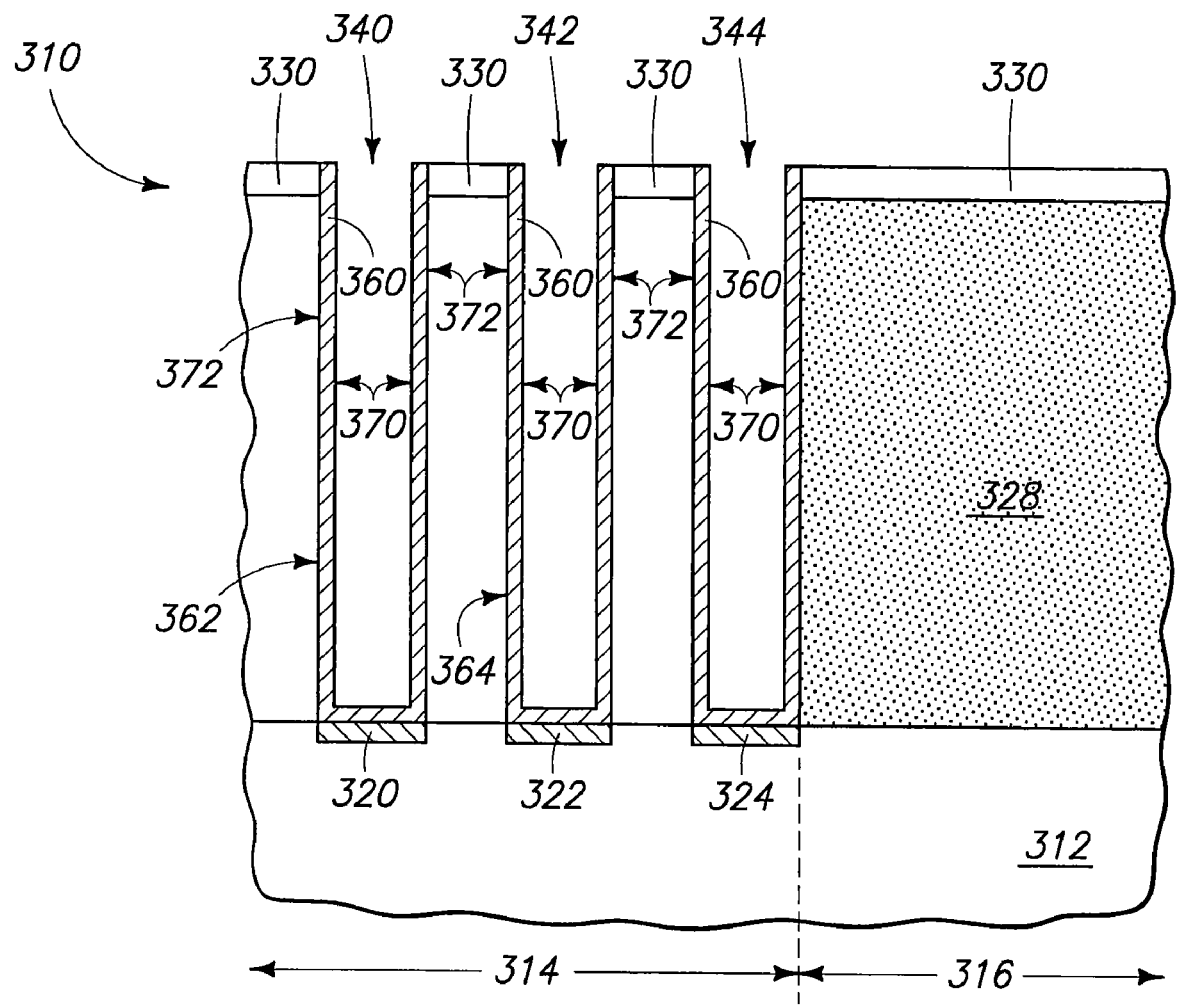

ETCH COMPOSITIONS AND METHODS OF PROCESSING A SUBSTRATE

This patent resulted from a divisional application of U.S. patent application Ser. No. 11/191,685 which was filed on Jul. 27, 2005.

TECHNICAL FIELD

The invention pertains to etchant compositions, methods of processing a substrate and methods of processing semiconductor constructions.

BACKGROUND OF THE INVENTION

Etching technology is frequently utilized for removing one or more materials during a variety of technical fabrication processing including, for example, semiconductor processing. In many applications an etch chemistry is chosen to selectively remove a first material relative to a second material. An etch is considered to be selective for a first material relative to a second material (or to be selective to the second material) if the etch removes the first material at a faster rate than the second material.

During semiconductor processing, wet etch techniques are commonly utilized to isotropically etch dielectric materials selectively relative to silicon materials. Wet etchants for isotropic oxide removal include etchants referred to as buffered oxide etchants (BOEs). Although such etchants are highly selective to silicon, some silicon etching can occur during the wet etch process. The slow etching of Si which occurs during wet etch processing can result in roughening of silicon surfaces, or unintentional thinning or removal of silicon materials. For example, removal of a gate oxide material during semiconductor fabrication can result in roughening of an underlying silicon surface which can ultimately compromise gate oxide integrity and/or tunneling oxide properties. Additional problems can arise during memory array formation where wet etch processing is utilized to remove dielectric materials within the array area near the periphery. Specifically, unintentional removal of a protective silicon material can expose dielectric material in the periphery leading to periphery blowout, where the term "blowout" refers to unintentional etching of material.

It is desirable to develop alternative etchant compositions and methods of processing substrates and semiconductor constructions.

SUMMARY OF THE INVENTION

In one aspect the invention encompasses an etchant composition containing one or more of HF, $NH_4F$, tetramethyl ammonium fluoride (TMAF), and alternative salts comprising fluoride. The etchant composition additionally contains isopropyl alcohol.

In one aspect the invention encompasses a method of processing a substrate. A substrate is provided which has a first material and a second material. The first material comprises at least one of polysilicon, monocrystalline silicon and amorphous silicon. The substrate is exposed to an etch composition which comprises isopropyl alcohol and at least one of HF, $NH_4F$, TMAF, and alternative fluoride ion salts.

In one aspect the invention encompasses a method of processing a semiconductor construction including providing a construction which has a capacitor electrode material and an oxide material along at least a portion of the capacitor electrode material. At least some of the oxide material is removed by isotropic etching utilizing an etchant composition comprising isopropyl alcohol.

BRIEF DESCRIPTION OF THE DRAWINGS

Preferred embodiments of the invention are described below with reference to the following accompanying drawings.

FIG. 8 is a diagrammatic, cross-sectional view of a semiconductor wafer fragment at a preliminary processing stage of another exemplary aspect of the present invention.

FIG. 9 is a diagrammatic, cross-sectional view of the FIG. 8 wafer fragment shown at a processing stage subsequent to that of FIG. 8.

FIG. 13 is a diagrammatic, cross-sectional view of the FIG. 10 wafer fragment shown at a processing step subsequent to that of FIG. 12.

DETAILED DESCRIPTION OF THE PREFERRED EMBODIMENTS

Figure 1:
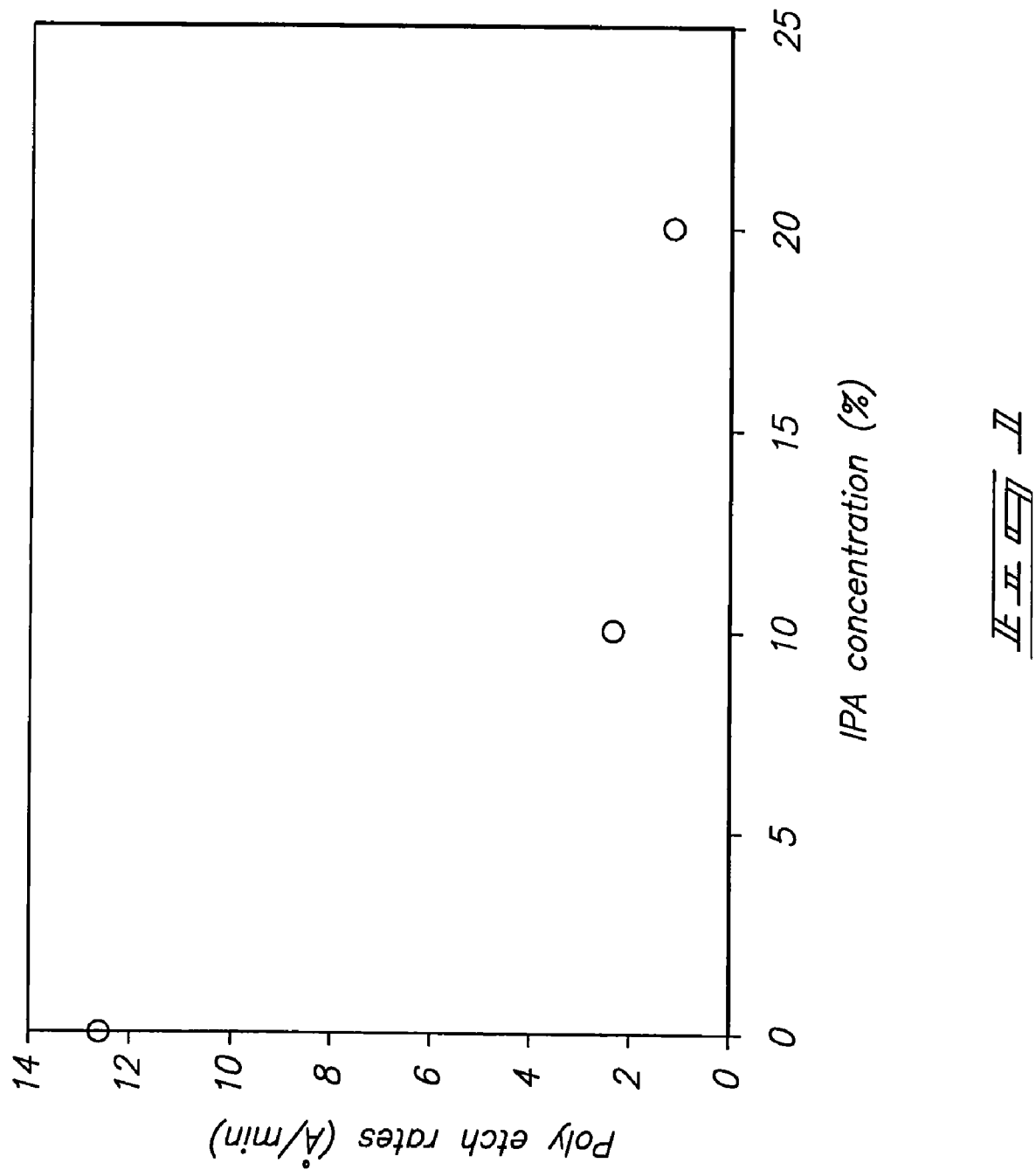
FIG. 1 is a plot of polysilicon etch rates as a function of isopropyl alcohol concentration.

This disclosure of the invention is submitted in furtherance of the constitutional purposes of the U.S. Patent Laws "to promote the progress of science and useful arts" (Article 1, Section 8).

One aspect of the invention includes etchant compositions which provide etchant chemistry for selective removal of dielectric materials relative to silicon. The compositions of the invention have increased selectivity and can result in decreased surface roughness as compared to conventional wet etch chemistries commonly utilized for removing dielectric materials relative to silicon materials. Accordingly, resulting structures produced in accordance with the methodology of the invention can have surfaces of silicon materials which have less roughening than conventionally produced structures, and can have more accurate thicknesses and uniformity for silicon layers and structural features. Additionally, the etching compositions in accordance with the invention can allow less problematic use of silicon materials as protective and/or sacrificial materials during fabrication, with more predictable and reliable results.

In general, etchant compositions in accordance with the invention are wet etchants which etch silicon materials more slowly than conventional wet etch chemistries. The etch chemistries of the invention are highly selective to silicon materials including doped and undoped polysilicon, hemispherical grain silicon (HSG), monocrystalline silicon and amorphous silicon materials. Specifically, etch compositions of the invention are able to remove oxide materials from a structure with little or no etching of silicon materials comprised by the structure. Although the invention is described as pertaining to selective removal of oxide materials, the invention contemplates adaptation for removal of alternative dielectric materials relative to silicon materials. The compositions of the invention can also be useful for removal of oxide materials selective to alternative materials including silicon-containing materials and non-silicon materials.

The most common conventional technique for selective removal of silicon oxide materials is hydrofluoric acid etchant. Typically, hydrofluoric acid (HF) is mixed with water and a buffering agent such as ammonium fluoride ($NH_4F$). These buffered wet etch solutions are commonly known as buffered oxide etches (BOEs). Conventional BOEs can differ in strength (typically HF concentration and/or ratio of buffering agent to HF) to vary the oxide etch rate. Conventional BOEs can also include additional agents such as wetting agents or surfactants. However, conventional BOEs are able to significantly etch silicon materials resulting in unintentional silicon removal and/or roughening of silicon surfaces. Such unintentional removal can result in damage to underlying materials, inaccurate or non-uniform layer thickness, etc.

The etchant composition of the present invention can comprise some or all of the components of conventional oxide etchants and can further comprise one or more additional component which decreases the rate of silicon etch. In general, the invention compositions are modified relative to conventional BOEs by addition of isopropyl alcohol. Typically the isopropyl alcohol concentration will be from greater than 0% to about 25%, by volume of the final etchant composition. Preferably the isopropyl alcohol content will be less than or equal to about 20%. Although the compositions of the invention are referred to as etchant compositions, the compositions can be utilized for applications such as cleaning surfaces and constructions and can therefore be alternatively referred to as cleaning compositions.

Etchant compositions of the invention typically comprise HF. The HF can be provided to the composition by mixing HF and other composition components or can be generated by providing a source of $H^+$ and a source of $F^-$ to the composition. Etchant compositions of the invention are typically aqueous solutions or mixtures containing one or more buffering agent. It is to be understood however, that the invention contemplates utilization of etchant compositions which contain, consist essentially of, or consist of water, isopropyl alcohol and equilibrium components of HF.

Buffering agents which can be utilized in compositions in accordance with the invention include, but are not limited to, $NH_4F$, tetramethyl ammonium fluoride (TMAF), and $H_3PO_4$. In particular aspects, the etchant composition will comprise one or more of HF, $NH_4F$, TMAF and fluoride salts comprising alternative cations. In some instances, the etchant composition can consist essentially of or consist of water, isopropyl alcohol and equilibrium components of HF and $NH_4F$, at least prior to exposing of the etchant composition to a material or substrate to be etched. Where the etching composition contains HF and $NH_4F$, the HF can be added to provide a final HF concentration (including equilibrium components) of from about 0.05% to about 20%, by volume. Where $NH_4F$ is utilized the concentration of such buffering agent can be from 1% to about 45%, and preferably from about 30% to about 40%, by volume. In particular instances, the $NH_4F$ concentration will be from 33.75% to about 39.82% of the final etchant composition prior to exposing to a material to be etched. Accordingly, preferred $NH_4H$:HF ratios can be from about 0.5:1 to about 1000:1, and will typically be from about 2:1 to about 500:1, by volume.

Formation of etchant compositions in accordance with invention can comprise providing a source of $F^-$, such as $NH_4F$ and/or TMAF, and a source of protons such as $H_3PO_4$. It is to be understood that the invention contemplates utilization of alternative or additional sources of $F^-$ and/or $H^+$. In particular applications the etchant composition prior to exposing of any substrate or material to be etched can consist essentially of or consist of water, isopropyl alcohol, HF and equilibrium components thereof and one or more buffering agents. In alternative aspects, one or more reducing agent can be added to the etchant composition. Either organic or inorganic reducing agents, or a combination thereof, can be utilized. An exemplary reducing agent for use in compositions of the invention is ascorbic acid.

Although not limited to a particular pH or range of pH's, etchant compositions in accordance with the invention can typically have a pH in the range of from about 3.5 to about 8.5. In particular instances, the pH can be from about 7.19 to about 7.25.

In addition to the compositions described above, the invention encompasses etchant compositions formed by addition of isopropyl alcohol to alternative buffered oxide etchant chemistries, either conventional or yet to be developed. The isopropyl alcohol is preferably added to the BOE to a final Isopropyl alcohol concentration of up to about 20%, by volume.

The etchant compositions of the invention can selectively remove one or more of a variety of oxide materials relative to other materials, particularly silicon materials. The oxide material selectively removed can be, for example, thermally grown oxides (ThOx), deposited oxides, or combinations thereof. The etched oxides can be doped and/or undoped silicon dioxide materials including, but not limited to, phosphosilicate glass materials and borophosphosilicate glass materials. The etch rate of the particular dielectric material(s) to be etched can be adjusted by adjusting the concentration of one or more components of the etchant composition.

In addition to decreasing silicon surface roughening and/or silicon etch, the addition of isopropyl alcohol can produce etch compositions with a lower BPSG/ThOx selectivity. Accordingly, etchant compositions of the invention can be especially useful for applications such as contact cleans. Etch rates for a variety of materials, and roughening of silicon surfaces were compared for isopropyl alcohol (IPA) etch compositions in accordance with the invention and alternative non-IPA etch compositions.

Referring to FIG. 1, such shows etch rates of a polysilicon material as a function of isopropyl alcohol concentration. The etchant utilized was an aqueous mixture containing a 20:1 $NH_4H$ to HF ratio, by volume (using 40% $NH_4H$ and 49% HF solutions), to which isopropyl alcohol was added from 0% to 20% by volume of the final etchant solution. The non-IPA etchant had a HF concentration of 2.5%. The results shown in FIG. 1 indicate that as isopropyl alcohol concentration increases, the etch rate of polysilicon drops exponentially.

With a 10% isopropyl alcohol concentration the polysilicon etch rate is observed to be about 2.3 Å per minute.

Figure 2:
FIG. 2 shows the difference in etch rates for a variety of materials in the presence and absence of 10% isopropyl alcohol.

Referring to FIG. 2, such presents results of comparison studies of etching of a variety of materials in the presence and absence of 10% isopropyl alcohol. The various BPSG materials utilized for the study included polysilicon, ThOx, BPSG1 which comprises 3.8% boron (in the form of $B_2O_3$) and 6.9% phosphorous (in the form of $P_2O_5$); and BPSG2 which comprises 3.0% boron and 7.6% phosphorous. The etching study utilized a non-IPA etchant composition containing 0.95-1.05% $H_3PO_4$ and from 39.3-39.8% $NH_4F$ in aqueous solution where percentages indicate weight %. The pH of the etchant composition was from about 7.19 to about 7.25. The etchant containing 10% isopropyl alcohol was prepared by adding isopropyl alcohol to the above non-IPA etchant composition to produce a final isopropyl alcohol etchant composition containing 10% isopropyl alcohol, by volume. The results shown in FIG. 2 indicate a reduction in polysilicon etch rate of greater than fourfold by addition of 10% IPA. The results also indicate that the addition of 10% IPA minimally affects the etch rate for thermal oxide and various BPSG materials with a slight improvement/lowering of BPSG/thermal oxide selectivity. This lowering of selectivity can be especially useful for applications such as contact cleaning processes.

Comparison studies were also performed utilizing a alternative etch composition which contained HF buffered with TMAF to which either no isopropyl alcohol had been added or to which isopropyl alcohol had been added to a final volume of 10%. The addition of 10% isopropyl alcohol was shown to decrease the rate of polysilicon etch by around tenfold. The addition of 10% isopropyl alcohol to the TMAF:HF etchant did not significantly affect etch rate of thermal oxide or various BPSG materials.

Figure 3:
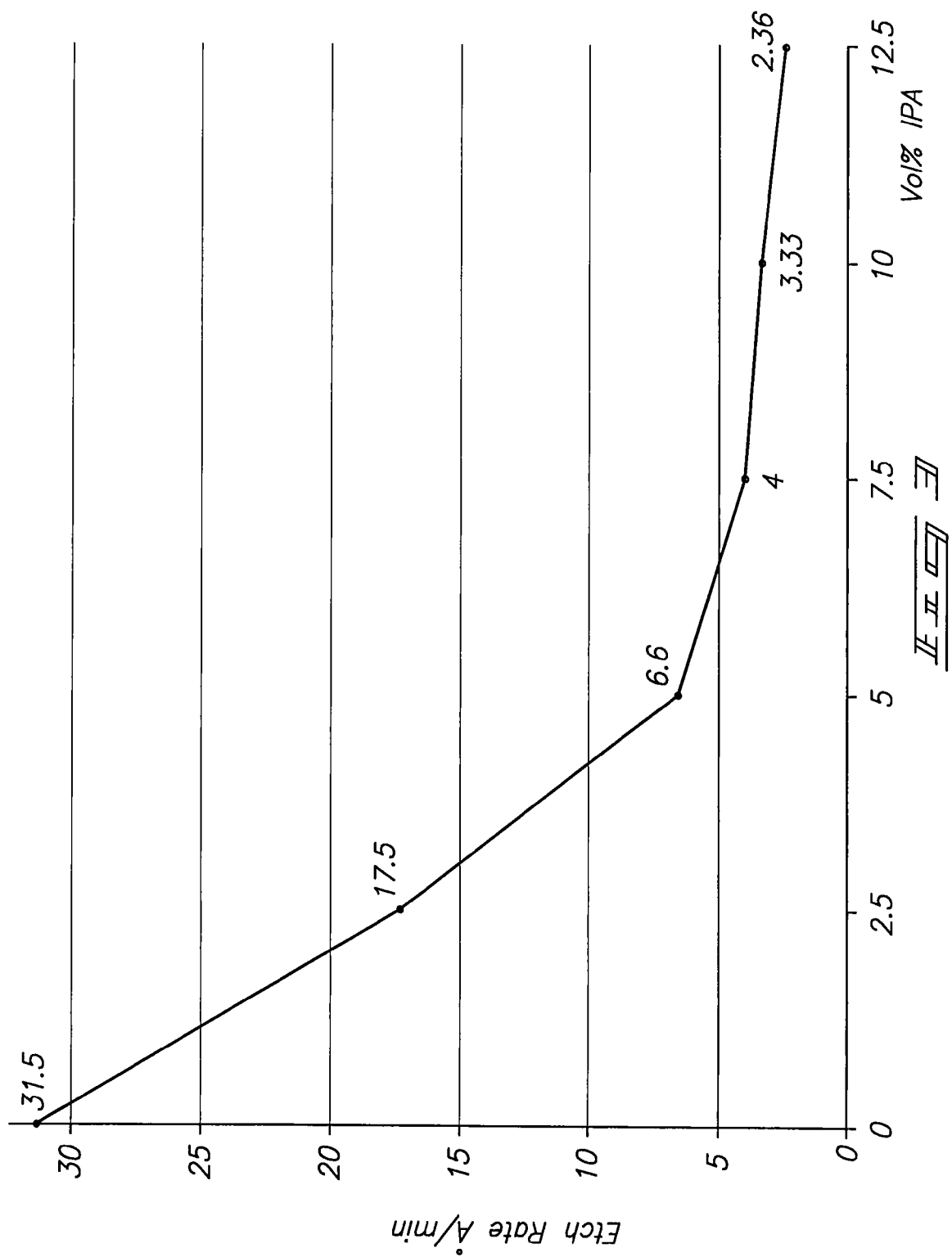
FIG. 3 shows etch rates for n-doped polysilicon as a function of isopropyl alcohol volume.

In addition to the etch rate studies above, the etch rate of n-doped polysilicon was studied as a function of added IPA volume in a 40 L volume tank. The results of such studies are presented in FIG. 3. As shown, the etch rate of n-doped polysilicon decreases as a function of added IPA. These results indicate that IPA addition should improve roughness (decrease roughness of silicon material surfaces) in fluoride etchants, which is further confirmed by atomic force microscope (AFM) measurements (see below).

The measured etch rates for additional materials as a function of isopropyl alcohol concentration is presented in Table 1.

TABLE 1

Effect of Isopropyl Alcohol on Etch Rates

| Film | Chemistry | Etch rate (Å/min) | Selectivity PSG/poly | PSG/Nitride |
|------|-----------|-------------------|----------------------|-------------|
|      |           |                   | 80.4                 | 134         |
| 25 poly | 20:1 BOE | 12.5 | | |
| PSG 6.0 | 20:1 BOE | 1005 | | |
| BPSG | 20:1 BOE | 549 | | |
| $Si_3N_4$ | 20:1 BOE | 7.5 | | |
| ThOx | 20:1 BOE | 323 | | |
| SOD | 20:1 BOE | 532 | | |
|      |           |                   | 380                  | 125         |
| 25 poly | 20:1 BOE + 10% IPA | 2.3 | | |
| PSG 6.0 | 20:1 BOE + 10% IPA | 874 | | |
| BPSG | 20:1 BOE + 10% IPA | 231 | | |
| $Si_3N_4$ | 20:1 BOE + 10% IPA | 7 | | |

TABLE 1-continued

Effect of Isopropyl Alcohol on Etch Rates

| Film | Chemistry | Etch rate (Å/min) | Selectivity PSG/poly | PSG/Nitride |
|------|-----------|-------------------|----------------------|-------------|
| ThOx | 20:1 BOE + 10% IPA | 270 | | |
| SOD | 20:1 BOE + 10% IPA | 433 | | |
|      |           |                   | 702                  | 145         |
| 25 poly | 20:1 BOE + 20% IPA | 1.2 | | |
| PSG 6.0 | 20:1 BOE + 20% IPA | 842 | | |
| BPSG | 20:1 BOE + 20% IPA | 201 | | |
| $Si_3N_4$ | 20:1 BOE + 20% IPA | 5.8 | | |
| ThOx | 20:1 BOE + 20% IPA | 260 | | |

The materials studied as presented in Table 1 include 25 Poly (n-doped polysilicon ($1.0E+20$ cm$^{-2}$)), phosphosilicate glass (PSG containing 6% P which has been annealed for 32 minutes at 700° C.), BPSG 3060 (3% B, 6% P), thermally grown silicon oxide (ThOx), thermal $Si_3N_4$ (725° C.) and spin-on-dielectric (SOD) with 600° C. densification.

Resulting surface roughness of silicon materials as a result of various oxide etch solutions were studied and compared. Surface roughness was found to be dependent upon etch chemistry, process time, dopants and previous history of wafers or substrates (i.e. dopant implants). Typical roughness produced by processes utilizing conventional wet etch solutions are presented in Table 2.

TABLE 2

Roughness effects of non-IPA oxide etch solutions

| Process | $R_q$ (nm) | $R_a$ (nm) | Z range (nm) |
|---------|------------|------------|--------------|
| w/implant; 90 sec 20:1 BOE | 0.22 | 0.17 | 5.61 |
| w/implant; 450 sec 100:1 BOE | 1.28 | 0.98 | 11.97 |
| w/implant; 350 sec 100:1 BOE | 0.63 | 0.51 | 5.10 |
| w/implant; 1200 sec 100:1 HF | 0.20 | 0.15 | 8.42 |
| w/implant; 250 sec 25:1 HF | 0.19 | 0.15 | 1.73 |
| w/implant; 600 sec QE2 | 0.62 | 0.49 | 7.85 |
| Control (no processing) | 0.18 | 0.14 | 1.82 |
| No Implant; 90 sec 20:1 BOE | 0.20 | 0.16 | 1.83 |
| No Implant; 450 sec 100:1 BOE | 0.37 | 0.29 | 3.44 |
| w/implant; 290 sec 25:1 HF | 0.20 | 0.16 | 1.89 |

The silicon material utilized for the roughening studies presented in Table 2 was p-doped silicon wafers with a 230 Å oxide layer. For samples having undergone implant treatment, such treatment included 2E13, 2800 kV P implant, and 1E13, 700 kV B implant. The BOE etchant solutions contained $NH_4F$:HF ratios as indicated. The etchant denoted as QE2 contained approximately 39% $NH_4H$, and approximately 1% $H_3PO_4$, by weight. The surface roughness for wafers having undergone previous implant processing were compared to wafers which had not undergone implant processing and to a control which was not subjected to any oxide etch solution. In Table 2, and in the roughness study results presented below, the parameter $R_q$ represents the standard deviation of the Z values, and $R_a$ is the mean value of the surface relative to the center plane. The results indicate that etch chemistries having slower silicon etch rate and better oxide etch uniformity such as 100:1 BOE introduces more silicon surface roughness.

Surface roughness was also studied upon performing a pad oxide strip in a variety of conventional wet oxide chemistries as presented in Table 3.

TABLE 3

Surface roughness after pad-oxide strip with non-IPA oxide etch solutions

| Pad-oxide strip | $R_q$ (nm) | $R_a$ (nm) | Z range (nm) |
|---|---|---|---|
| 15 sec 20:1 BOE | 0.27 | 0.21 | 2.85 |
| 60 sec 100:1 BOE | 0.35 | 0.28 | 3.45 |
| 37 sec 25:1 HF | 0.25 | 0.20 | 2.41 |
| 240 sec 100:1 BOE | 0.51 | 0.40 | 5.16 |

A comparison study was performed between a conventional BOE solution treatment of a bare silicon wafer relative to the same BOE solution which has been modified by addition of isopropyl alcohol to a final concentration of 10%. The results of such study are present in Table 4.

TABLE 4

Roughness effects of non-IPA and isopropyl alcohol oxide etch solutions

| Process | $R_q$ (nm) | $R_a$ (nm) | Z range (nm) |
|---|---|---|---|
| 65 sec 100:1 BOE | 0.34 | 0.27 | 3.41 |
| 150 sec 100:1 BOE | 0.40 | 0.31 | 4.00 |
| 240 sec 100:1 BOE | 0.39 | 0.30 | 4.11 |
| 65 sec 100:1 BOE + 10% IPA | 0.23 | 0.18 | 2.44 |
| 150 sec 100:1 BOE + 10% IPA | 0.24 | 0.19 | 2.70 |
| 240 sec 100:1 BOE + 10% IPA | 0.25 | 0.20 | 3.40 |
| No process | 0.16 | 0.13 | 1.82 |

For each experiment the ratio of $NH_4F:HF$ was 100:1. The results present in Table 4 indicate a substantial roughness reduction in the presence of 10% IPA, by volume. These results indicate that the 100:1 BOE in the presence of 10% IPA can be advantageous for utilization in many oxide etch applications, including but not limited to, those which conventionally utilize non-IPA etchants such as, for example, 20:1 BOE or 25:1 HF.

The decreased silicon etch rate and decreased surface roughening which occurs utilizing the etchant compositions of the invention indicates advantageous utilization for a variety of wet etch processing events. The compositions of the invention can advantageously replace conventional buffered oxide etchants at many points during semiconductor construction and wafer fabrication. Exemplary applications for which the compositions of the invention can be advantageously utilized include, but are not limited to, oxide stripping, contact cleans, oxide patterning and oxide removal processes during formation of double sided container capacitors or other capacitor structures. One application of particular importance is dual or triple gate formation processing where the methodology of the invention can be used to selectively remove gate dielectric materials from over some portions of the wafer while retaining gate dielectric material in desired locations.

Exemplary processing of substrates and semiconductor constructions in accordance with the invention are discussed below. However, it is to be understood that the invention contemplates utilization of the above described isopropyl alcohol containing etchant compositions in place of conventional wet oxide etch solutions throughout semiconductor fabrication processing.

Figure 4:
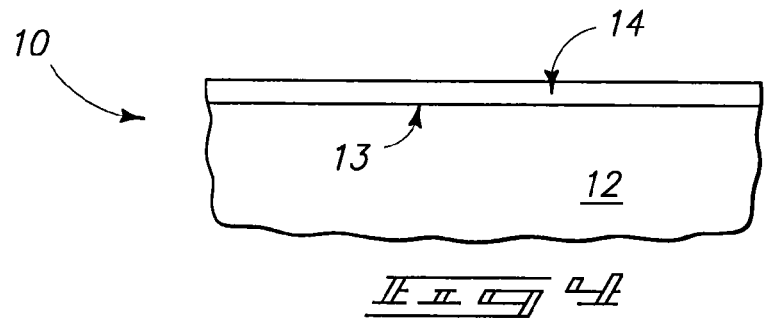
FIG. 4 is a diagrammatic, cross-sectional view of a semiconductor wafer fragment at a preliminary processing stage of an exemplary aspect of the invention.

Referring to FIG. 4, a semiconductor wafer fragment 10 is shown at a preliminary processing stage of an exemplary aspect of the present invention. Fragment 10 comprises a substrate 12. Substrate 12 can comprise, consist essentially of, or consist of, for example, monocrystalline silicon lightly-doped with background p-type dopant. To aid in interpretation of the claims that follow the terms "semiconductive substrate" and "semiconductor substrate" are defined to mean any construction comprising semiconductive material, including but not limited to, bulk semiconductive materials such as a semiconductive wafer (either alone or in assemblies comprising other materials thereon) and semiconductive material layers (either alone or in assemblies comprising other materials). The term "substrate" refers to any supporting structure including, but not limited to, the semiconductive substrates described above.

Figure 5:
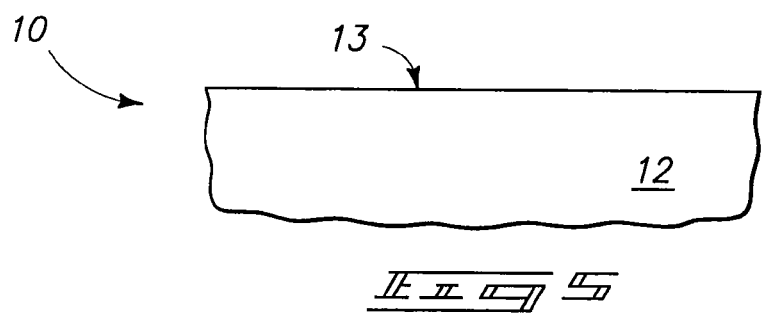
FIG. 5 is a diagrammatic, cross-sectional view of the FIG. 4 wafer fragment shown at a processing stage subsequent to that of FIG. 4.

In particular aspects, the substrate 12 can comprise a silicon material surface 13. As shown, a second material layer 14 can be disposed over surface 13. Material 14 can be an oxide material and in particular instances can comprise a thermally grown silicon dioxide material. Referring to FIG. 5, material 14 has been selectively removed exposing silicon surface 13. In accordance with the invention, selective removal of oxide layer 14 can comprise exposing the substrate to an etchant composition containing isopropyl alcohol. The etchant composition can be, for example, any of the isopropyl alcohol containing etchant compositions described above. The exposing to etchant composition can comprise, for example, spray etching or dipping of wafer 10 into the etchant composition.

The concentration of components within the etchant composition can be adjusted to allow a controlled etch of the particular material comprised by layer 14. The length of exposure of wafer 10 to the etchant composition can vary depending upon the material composition of oxide layer 14, the thickness of layer 14 and/or the presence and nature of additional features comprised by fragment 10. Processing in accordance with the invention can provide surface 13 of FIG. 5 to have decreased roughening relative to conventional oxide stripping methodology.

Figure 6:
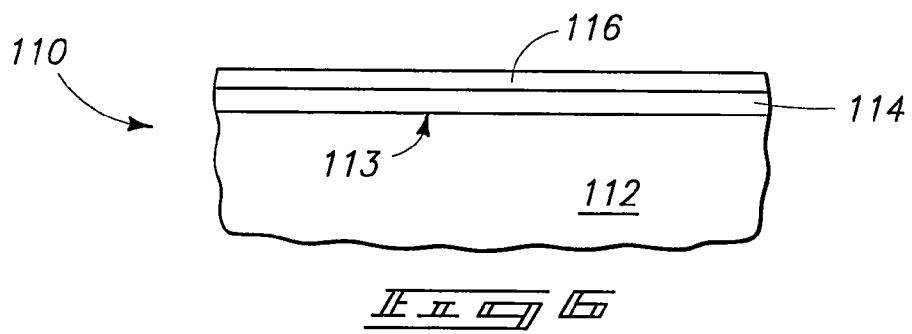
FIG. 6 is a diagrammatic, cross-sectional view of a semiconductor wafer fragment at a preliminary processing stage of another exemplary aspect of the present invention.

Referring next to FIG. 6, such shows a wafer fragment 110 having a substrate 112 over which has been formed a first layer 114 and a second layer 116 over first layer 114. Layer 114 can comprise, for example, a silicon material such as doped or undoped monocrystalline, polycrystalline or amorphous silicon. Layer 116 can comprise, for example, an oxide material such as, for example, doped or undoped silicon dioxide. Although FIG. 6 depicts a substrate surface 113 and overlying layers 114 and 116 as being substantially planar, it is, to be understood that the invention encompasses processing in accordance with methodology of the invention where one or more of surface 113 and layers 114 and 116 are non-planar, patterned and/or contoured (not shown).

Figure 7:
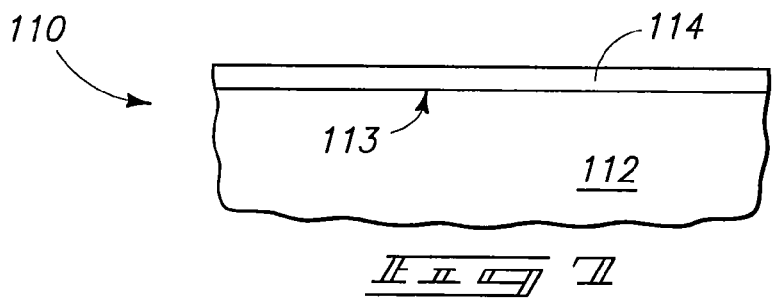
FIG. 7 is a diagrammatic, cross-sectional view of the FIG. 6 wafer fragment shown at a processing stage subsequent to that of FIG. 6.

Referring to FIG. 7, oxide material layer 116 can be selectively removed relative to silicon material layer 114 by, for example, exposing the substrate to an isopropyl alcohol containing etchant composition such as any of the compositions described above.

Referring next to FIG. 8, such shows an alternative aspect of the invention. A wafer fragment 210 can be provided having substrate 212 comprising a first material over which has been formed an oxide material layer 214. As depicted, oxide layer 214 has an opening 215 extending therethrough, and a structural layer 216 within such opening. The structure shown in FIG. 8 can be, for example, an intermediate structure present during formation of a capacitor construction. Accordingly, material 216 can be a capacitor electrode material such as, for example, silicon or conductively doped silicon. Substrate 212 can comprise a silicon material such that all or a portion of surface 213 comprises such silicon material. It is to be understood however, that additional structural features can be present which are not specifically illustrated in FIG. 8.

Referring next to FIG. 9, oxide material 214 has been removed selectively relative to silicon materials 216 and silicon materials comprise by substrate 212. In accordance with the invention, the selective removal of oxide layer 214 can comprise exposing wafer fragment 210 to an etchant composition in accordance with the invention. The etchant composition can comprise any of the isopropyl alcohol containing etchant compositions described above. The exposure time and concentration of composition components can vary depending upon the composition of oxide material 214 and the thickness of such layer. It can be advantageous to utilize isopropyl alcohol compositions in accordance with the invention to allow decreased surface roughening for exposed surface 213 and/or the exposed outer surface of conductive layer 216, and to provide predictable, precise and uniform thickness of the capacitor electrode material by avoiding or minimizing unintentional removal of silicon material during the wet etch processing.

Figure 10:
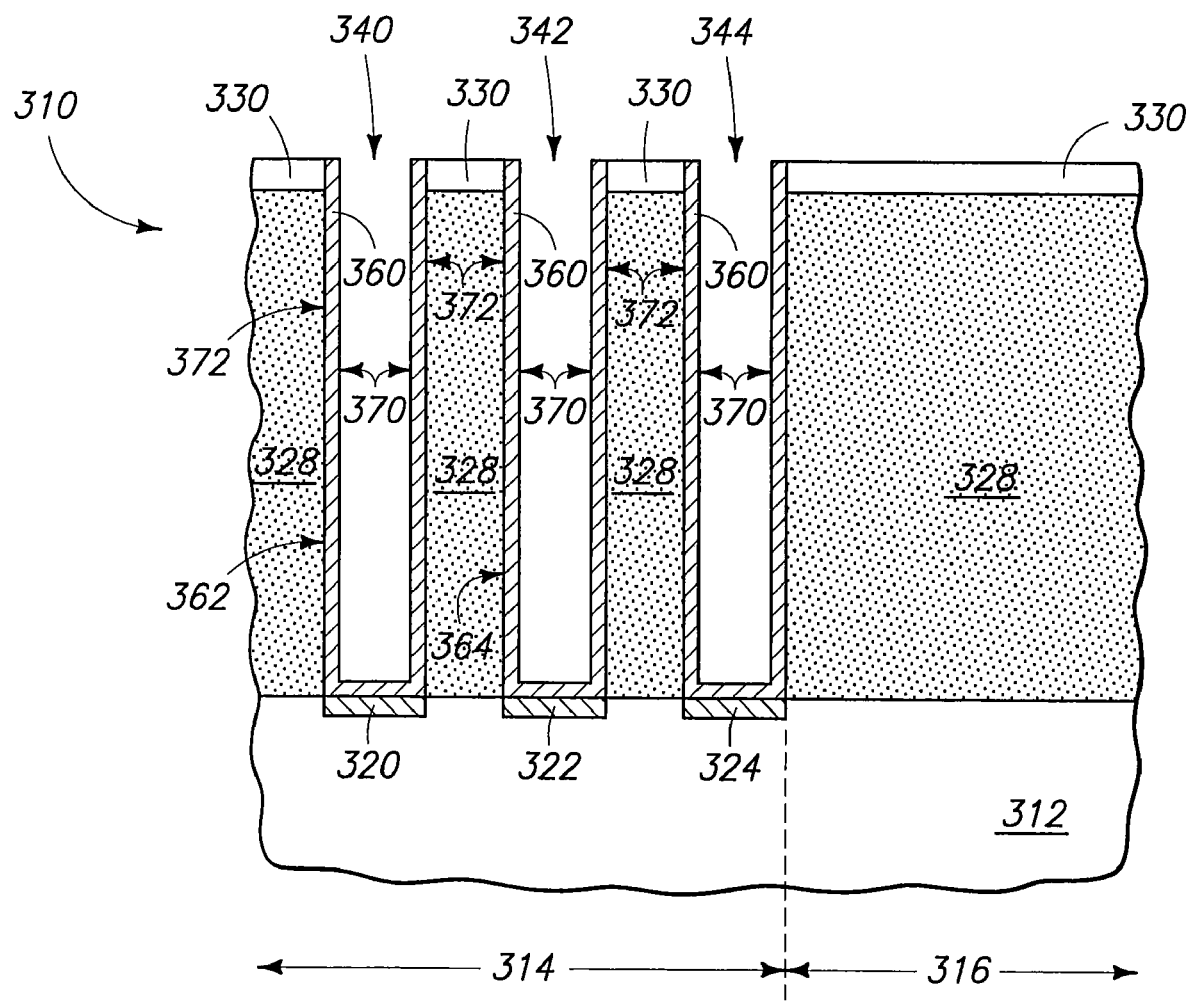
FIG. 10 is a diagrammatic, cross-sectional view of a semiconductor wafer fragment at a preliminary processing stage of an additional exemplary aspect of the present invention.

Additional exemplary processing in accordance with another aspect of the invention is described with references to FIGS. 10-13. Referring initially to FIG. 10, a wafer fragment 310 is shown comprising a substrate 312. Substrate 312 is divided into two defined regions 314 and 316. Region 314 corresponds to a memory array region. Region 316 corresponds to a region other that the memory array and can correspond to, for example, a so called peripheral region. Region 316 is referred to as a peripheral region because it is peripheral to the memory array region. Typically, logic circuitry and other circuitry associated with the control of data flow to and from memory devices associated with memory array region 314 would be associated with the peripheral region 316. It is to be understood that the depicted array and peripheral regions are exemplary and that alternative configurations and intermediate structures can be present which are not specifically depicted in the illustrations. Dashed lines are provided through construction 310 to demarcate the defined regions 314 and 316 extending within the structure. Various circuit devices (not shown) could be associated with region 316 at the processing stage of FIG. 10.

A plurality of electrically conductive node locations 320, 322 and 324 are shown within memory array region 314 of substrate 312. The node locations can correspond to, for example, conductively doped diffusion regions within a semiconductive material of substrate 312, and/or two conductive pedestals associated with substrate 12. Although the node locations are shown to be electrically conductive at the processing stage of FIG. 10, it is to be understood that the electrically conductive materials of the node locations could be provided at a processing stage subsequent to that of FIG. 10 in various other aspects of the invention (not shown). Node locations 320, 322 and 324 can ultimately be electrically connected with transistor constructions (not shown in FIG. 10) and can correspond to source/drain regions of the transistor constructions, or can be ohmically connected to source/drain regions of the transistor constructions. Transistor gates and other components of the transistor constructions can be present within memory array region 314 at processing stage of FIG. 10, or can be formed in subsequent processing. A layer 328 is formed over substrate 312. Although layer 328 is depicted as comprising a single homogenous layer it is to be understood that layer 328 can comprise multiple layers of differing composition and/or physical properties. Layer 328 can comprise, consist essentially of or consist of one or more electrically insulative materials. In particular aspects, layer 328 will comprise, consist essentially of, or consist of one or more of borophosphosilicate glass (BPSG), spin-on-glass (SOG) or other spin on dielectric, undoped silicon dioxide, phosphosilicate glass (PSG), borosilicate glass (BSG), alternatively doped glass, undoped glass and/or other oxide materials. In some aspects layer 328 will comprise, consist essentially of, or consist of silicon and oxygen.

In the exemplary structure shown in FIG. 10, a retaining structure (also referred to as a lattice structure) 330 is formed over layer 328. The retaining structure was initially formed over the periphery region as well as the memory array region 314 and a series of openings 340, 342 and 344 have been introduced through structure 330 and into material 328 within the memory array region of the construction. Retaining structure 330 can comprise a single composition or can comprise two or more layers of differing composition.

In subsequent processing (described below) at least some of material 328 is selectively etched relative to at least some of material 330. Accordingly, retaining material 330 preferably comprises a composition to which at least some of material of layer 328 can be selectively etched. In particular aspects layer 328 can be considered to comprise a first material and structure 330 can be considered to comprise a second material to which the first material is ultimately selectively etched. In some aspects, retaining structures 330 will comprise, consist essentially of, or consist of silicon and nitrogen. In an exemplary aspect, layer 328 will comprise, consist essentially of, or consist of borophosphosilicate glass and retaining structures 330 will comprise, consist essentially of, or consist of silicon nitride.

As shown in FIG. 10, openings 340, 342 and 344 are formed to extend to the node locations associated with an upper surface of substrate 312 (with the node locations 320, 322 and 324 illustrated). The openings can have a very high aspect ratio and can ultimately be utilized for forming capacitor containers. The formation of the container openings within the memory array region can typically be accomplished by forming a photoresist mask (not shown) with photolithographic processing, and subsequently transferring a pattern from the patterned mask to underlying materials 328 and 330 followed by removal of the patterned photoresist mask. Although openings 340, 342 and 344 are shown and described as extending through material 328 to underlying conductive nodes, it is to be understood that one or more other layers (not shown) can be provided between the nodes and material 328 and that the openings can stop on the other layers or can be extending though such layers to the node location.

As additionally illustrated in FIG. 10, an electrically conductive layer 360 is formed within openings 340, 342 and 344. Electrically conductive layer 360 can be a homogenous composition of electrically conductive material or can comprise multiple layers of electrically conductive material. Accordingly, layer 360 can comprise, consist essentially of, or consist of one or more electrically conductive materials. The electrically conductive material with layer 360 can comprise any suitable materials including, for example, conductively-doped silicon, metal, and metal compounds. In particular aspects, layer 360 will comprise titanium nitride and titanium silicide. For instance, the nodes can comprise silicon, and an initial portion of layer 360 can be formed by depositing titanium within openings 340, 342 and 344 to form titanium silicide across upper surfaces of the nodes. Subsequently, excess Ti can be removed with, for example, a procedure known in the art as a SC1 (standard clean 1) process. Then, TiN can be deposited to form the remainder of conductive layer 360.

Portions of layer 360 within the openings in memory array region 314 can be considered to form container constructions 362, 364. The container constructions can be considered to comprise inner surfaces 370 within the openings and outer surfaces 372 laterally opposing the inner surfaces. The outer surfaces 372 extend along layer 328 and retaining structure 330.

Conductive layer 360 is ultimately to be incorporated into a capacitor electrode and in particular aspects can be incorporated into a capacitor storage node. Accordingly, layer 360 can be referred to as capacitor electrode material and in particular aspects can be referred to as electrically conductive storage node material.

Conductive material 360 is shown to only partially fill openings 340, 342 and 344 and thus to form container structures within the openings. In other aspects of the invention (not shown) the conductive material 360, either alone or in combination with other conductive materials, can completely fill the openings to form pedestal (or post) structures within the openings. The structures formed from conductive material 360 in the openings can be referred to as conductive structures.

Figure 11:
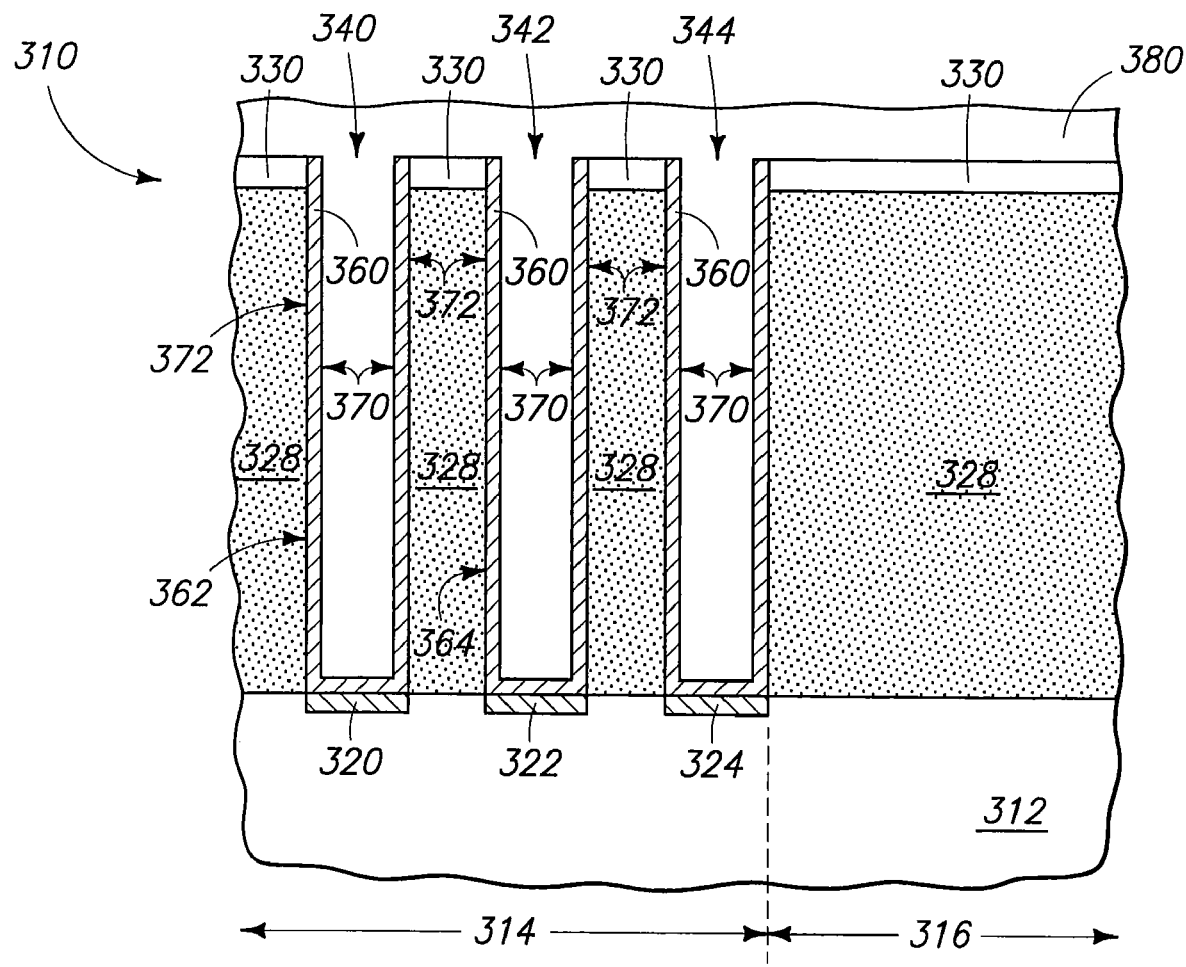
FIG. 11 is a diagrammatic, cross-sectional view of the FIG. 10 wafer fragment shown at a processing step subsequent to that of FIG. 10.

Referring next to FIG. 11, a sacrificial material 380 is formed over memory array region 314 and peripheral region 316. The sacrificial layer can, for example, comprise, consist essentially of, or consist of doped or undoped silicon (with doped silicon being understood as silicon having more than $1 \times 10^{16}$ at/cm$^3$ of dopant therein and undoped silicon being understood as silicon having less than $1 \times 10^{16}$ at/cm$^3$ of dopant therein). The silicon can be in any appropriate form including, for example, amorphous form and/or polycrystalline form. In particular instances, the sacrificial material will comprise, consist essentially of, or consist of n-doped polysilicon. The sacrificial material advantageously provides protection of some regions of layer 328 during an etch of other regions of layer 328. Typically, conventional wet etch methodology is utilized to remove oxide material 328 from within the memory array area 314. However, even with protection layer 380 present, the ability of conventional techniques to slowly etch the sacrificial material in layer 380 can result in failure to protect materials within the peripheral region 316. Accordingly, conventional wet etch methodology can result in peripheral blowout. However, processing in accordance with the invention can be utilized to expose the structure shown in FIG. 11 to wet etch processing whereby an isopropyl alcohol comprising wet etchant composition is utilized to selectively remove some, substantially all, or all of the oxide material 328 from within the array region while retaining the protected peripheral region intact as shown in FIG. 12.

The wet etch processing in accordance with the invention can utilize any of the isopropyl alcohol comprising etching compositions discussed above. Due to the increased selectivity to silicon, the etching compositions of the invention can allow removal of material 328 within the array with minimal or no etching, thinning or removal of protective polysilicon material 380 to produce an intact peripheral region.

Figure 12:
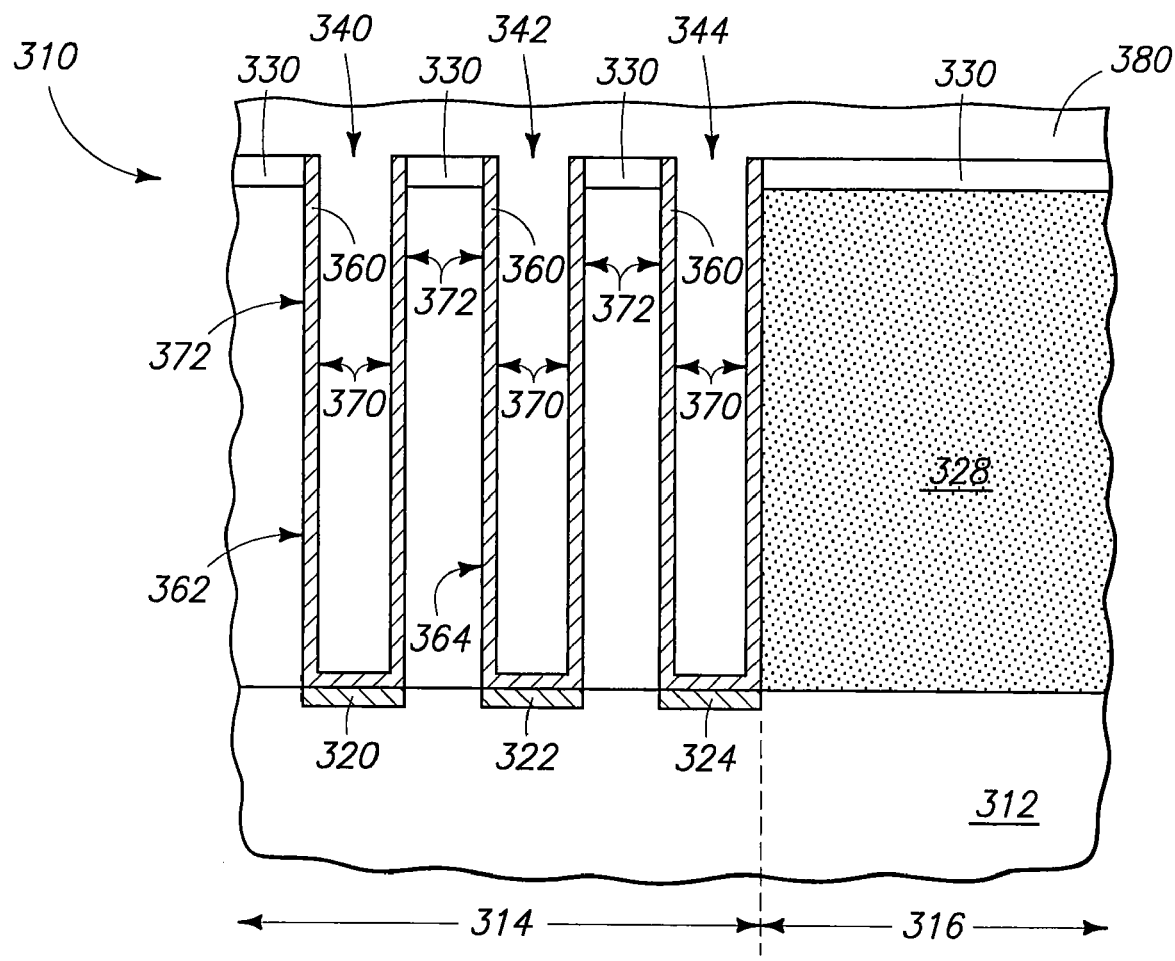
FIG. 12 is a diagrammatic, cross-sectional view of the FIG. 10 wafer fragment shown at a processing step subsequent to that of FIG. 11.

The removal of material 328 exposes outer surfaces 322 of the container structures as shown in FIG. 12. In the shown aspect of the invention, material 312 is substantially entirely removed from over memory array region 314 and accordingly an entirety of outer surfaces 372 are exposed. It is to be understood that the invention encompasses other aspects in which only a portion of material 328 is removed by the isotropic wet etch utilizing the isopropyl alcohol compositions of the invention. Accordingly, the invention encompasses embodiments where only portions of outer surfaces 372 are exposed. Retaining material 330 remains in physical contact with portions of conductive material 360 of the containers and accordingly support the containers.

Referring to FIG. 13, sacrificial material 380 is removed. Where sacrificial material 380 comprises, consist essentially of, or consist of doped or undoped silicon, the sacrificial material can be removed with, for example, tetramethyl ammonium hydroxide (TMAH). Typically, the sacrificial material will comprise, consist essentially of, or consist of n-doped polysilicon to allow rapid and selective removal with TMAH. The semiconductor construction shown in FIG. 13 can undergo additional processing (not shown) to complete container structures and form an array of capacitors.

Although the present description is limited to specific exemplary processing, it is to be understood that the invention contemplates utilization of wet etch chemistries described above to provide increased selectivity for removing oxide materials relative to silicon materials in numerous additional fabrication areas as will be understood by those of ordinary skill in the art.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. An etchant composition comprising:
one or both of HF, NH$_4$F;
tetramethyl ammonium fluoride (TMAF); and
isopropyl alcohol.

2. The etchant composition of claim 1 further comprising H$_3$PO$_4$.

3. The etchant composition of claim 1 wherein the composition has a pH of from about 3 to about 8.5.

4. The etchant composition of claim 1 further comprising a reducing agent.

5. The etchant composition of claim 1 wherein the composition contains from about 2% to about 10% isopropyl alcohol, by volume.

6. The etchant composition of claim 1 wherein the composition contains from about 30% to about 40% NH$_4$F.

7. The etchant composition of claim 1 wherein the composition contains from about 1% to about 45% NH$_4$F.

8. An etchant composition comprising:
tetramethyl ammonium fluoride (TMAF);
at least one reducing agent; and
isopropyl alcohol.

9. The etchant composition of claim 8 comprising a source of protons.

10. The etchant composition of claim 9 wherein the source of protons comprises H$_3$PO$_4$.

11. The etchant composition of claim 8 further comprising one or both of HF and NH$_4$F.

12. The etchant composition of claim 11 containing both NH$_4$F and HF and having a ratio of NH$_4$F:HF of from about 0.5:1 to about 1000:1.

13. The etchant composition of claim 12 wherein the ratio of NH$_4$F:HF is from about 2:1 to about 500:1.

14. The etchant composition of claim 8 wherein the isopropyl alcohol is present at from about 10% to about 20%, by volume.

15. An etchant composition comprising:
one or both of HF, NH$_4$F;
at least one reducing agent comprising ascorbic acid; and
isopropyl alcohol.

* * * * *